No. 648,919. Patented May 8, 1900.
S. G. BROWN.
ELECTRIC TELEGRAPH APPARATUS FOR USE ON CABLE OR OTHER LINES.
(Application filed June 6, 1899.)
(No Model.) 7 Sheets—Sheet 1.

Witnesses.
Jno. T. Cross
J. Henderson

Inventor,
Sidney George Brown,
by his Attorney.

No. 648,919. Patented May 8, 1900.
S. G. BROWN.
ELECTRIC TELEGRAPH APPARATUS FOR USE ON CABLE OR OTHER LINES.
(Application filed June 6, 1899.)
(No Model.) 7 Sheets—Sheet 2.

Witnesses.
Jno. T. Cross
J. Henderson

Inventor,
Sidney George Brown,
by / his Attorney.

No. 648,919. Patented May 8, 1900.
S. G. BROWN.
ELECTRIC TELEGRAPH APPARATUS FOR USE ON CABLE OR OTHER LINES.
(Application filed June 6, 1899.)
(No Model.) 7 Sheets—Sheet 3.
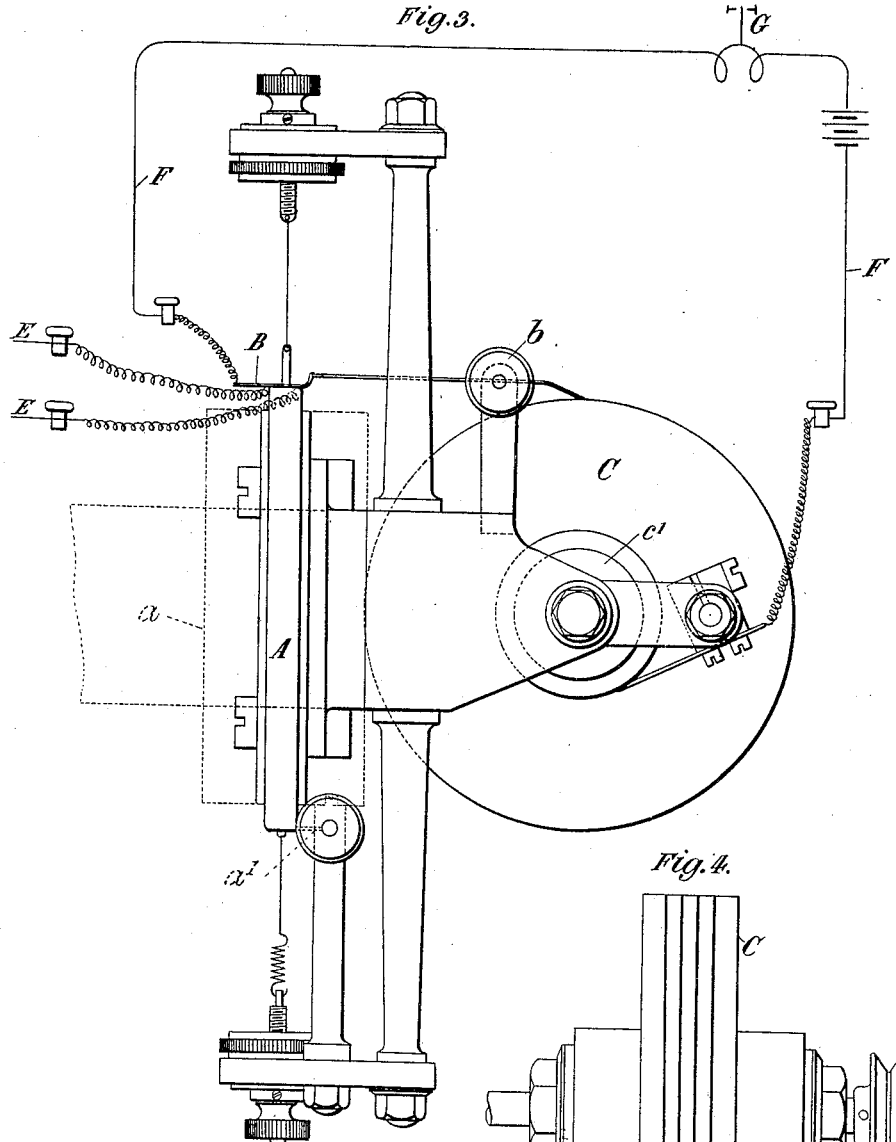
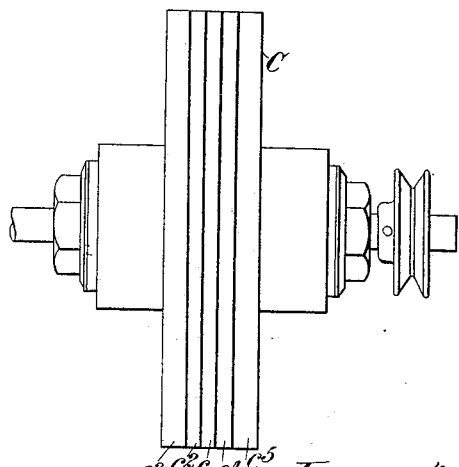
Inventor:
Sidney George Brown,
by his Attorney.

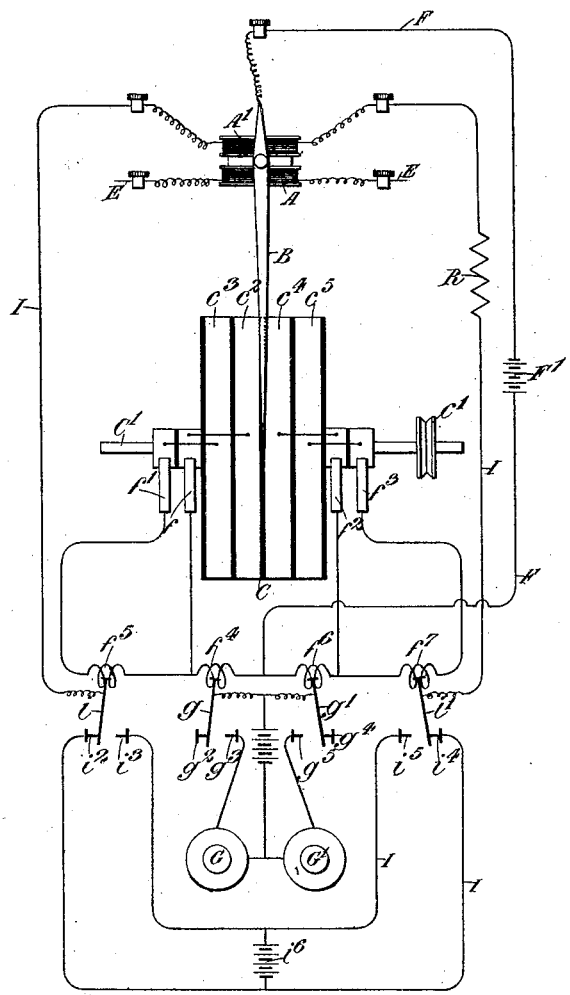

No. 648,919. Patented May 8, 1900.
S. G. BROWN.
ELECTRIC TELEGRAPH APPARATUS FOR USE ON CABLE OR OTHER LINES.
(Application filed June 6, 1899.)
(No Model.) 7 Sheets—Sheet 5.
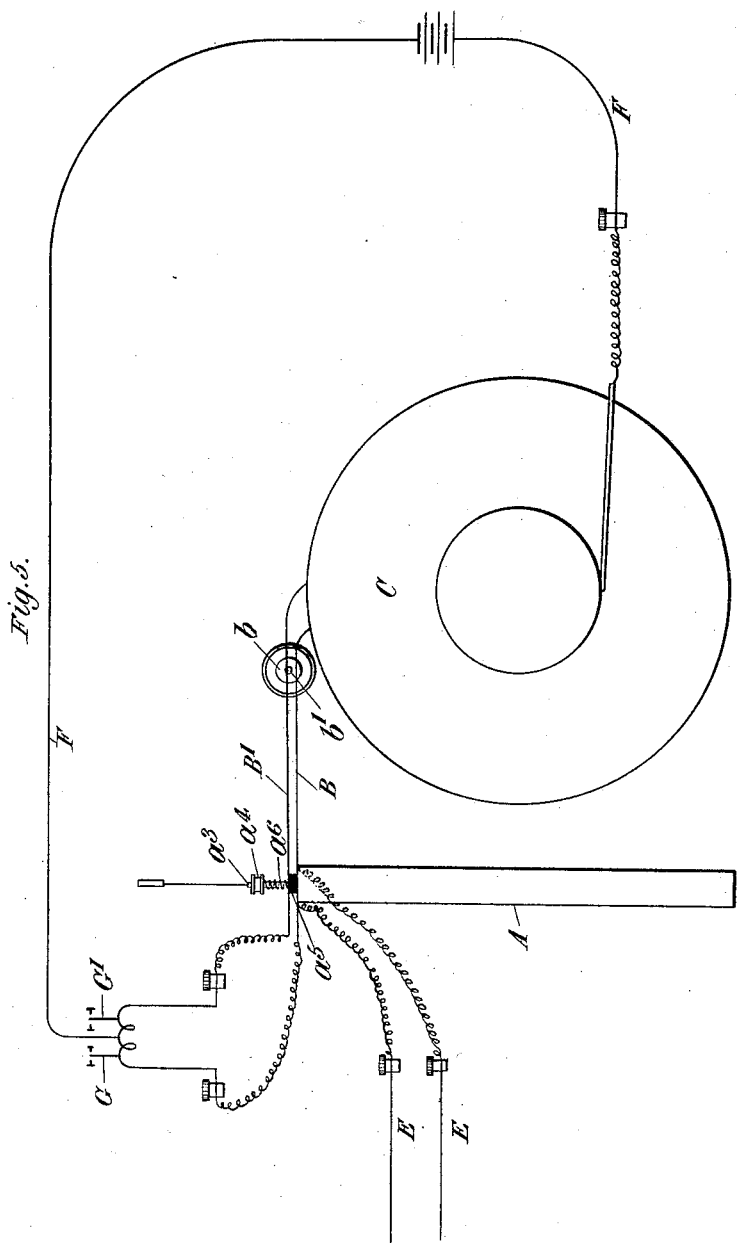
Witnesses.
Inventor
Sidney George Brown
by his Attorney.

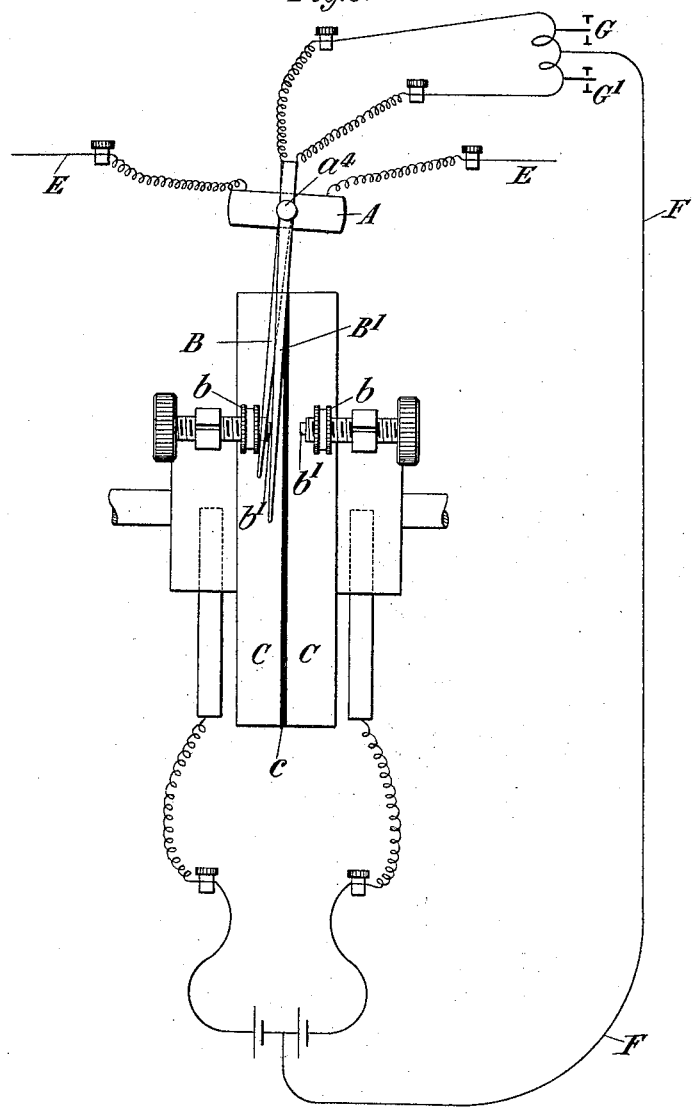

No. 648,919. Patented May 8, 1900.
S. G. BROWN.
ELECTRIC TELEGRAPH APPARATUS FOR USE ON CABLE OR OTHER LINES.
(Application filed June 6, 1899.)

(No Model.) 7 Sheets—Sheet 7.

Witnesses.
Jno. T. Cross
J. Henderson

Inventor
Sidney George Brown.
by Hime Pett,
his Attorney.

UNITED STATES PATENT OFFICE.

SIDNEY GEORGE BROWN, OF BOURNEMOUTH, ENGLAND.

ELECTRIC-TELEGRAPH APPARATUS FOR USE ON CABLE OR OTHER LINES.

SPECIFICATION forming part of Letters Patent No. 648,919, dated May 8, 1900.

Application filed June 6, 1899. Serial No. 719,557. (No model.)

*To all whom it may concern:*

Be it known that I, SIDNEY GEORGE BROWN, electrician, a citizen of the United States, residing at Van Buren, Poole road, Bournemouth, in the county of Hants, England, have invented certain new and useful Improvements in Electric-Telegraph Apparatus for use on Cable or other Lines, of which the following is a specification.

This invention relates to improvements in telegraphic relays whereby the relay is capable of being worked efficiently by minute electrical forces such as are likely to be encountered at the ends of long submarine cables and also of working with an absolute assurance of contact which is not in such cases obtainable with delicate relays when fixed contacts are employed.

In order that my invention may be clearly understood and readily carried into effect, I will now proceed to describe the same with reference to the accompanying drawings, in which—

Figure 1:
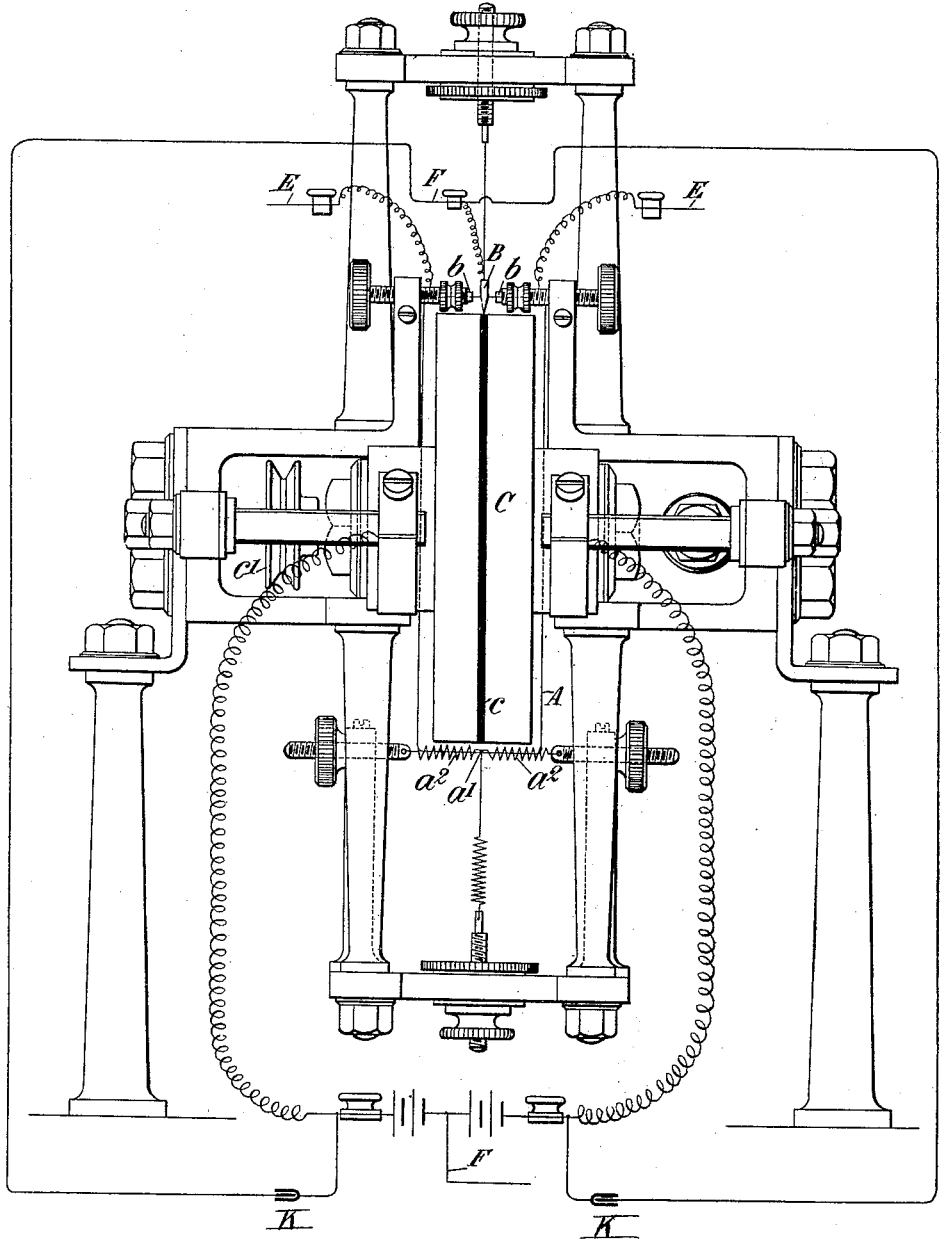
Figure 2:
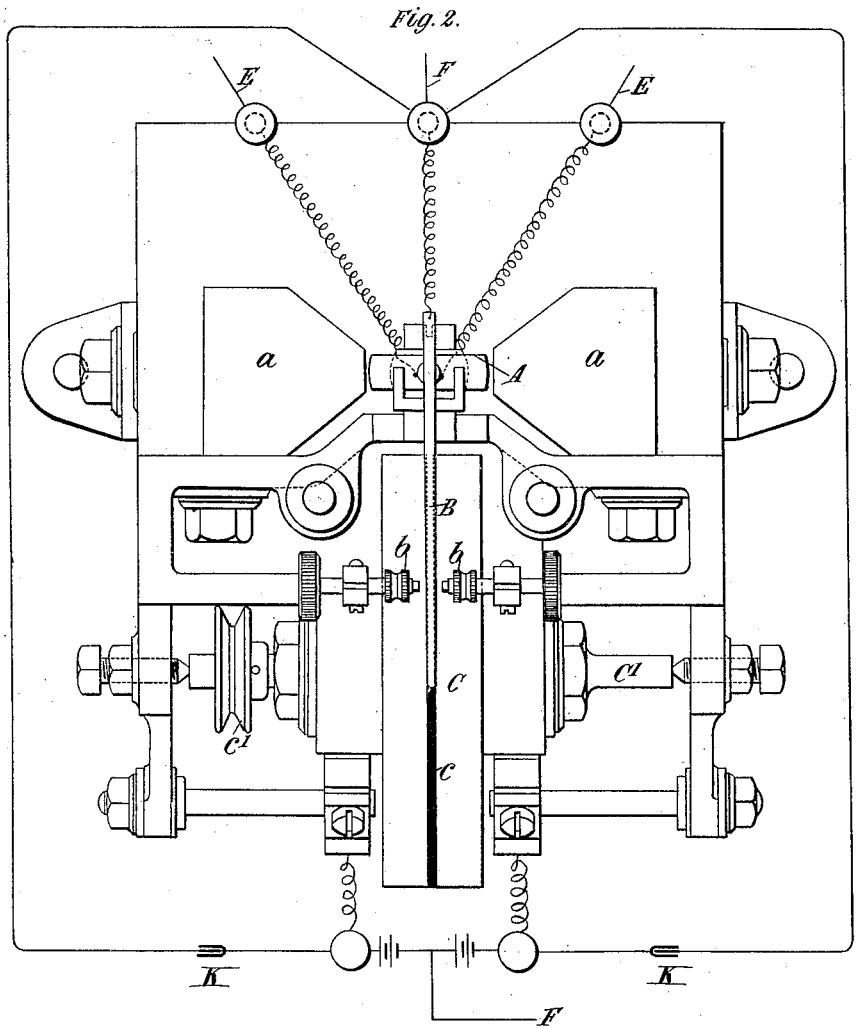
Figure 7:
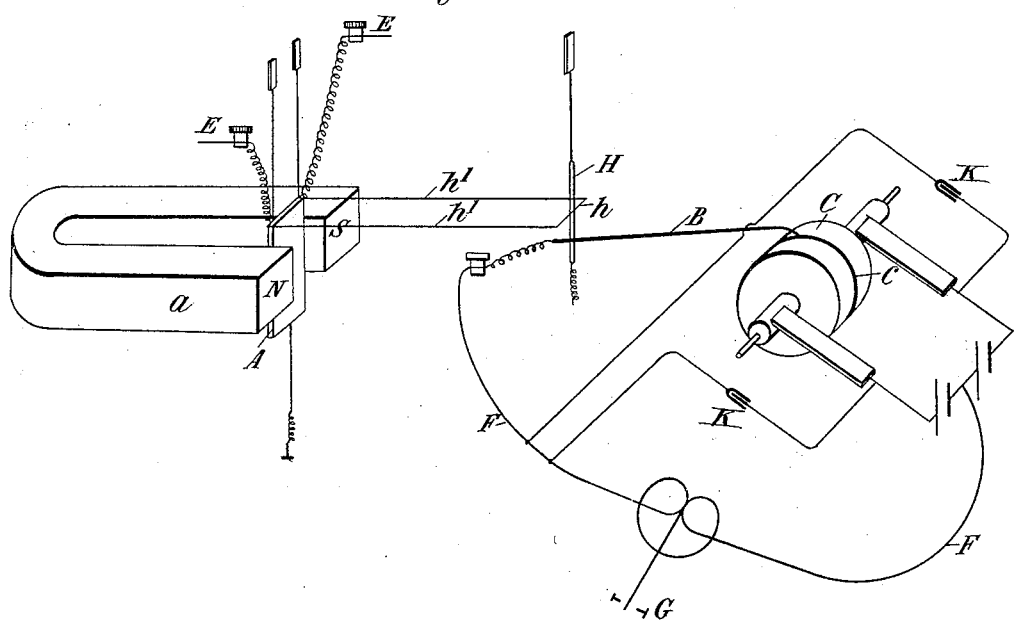
Figures 8, 9:
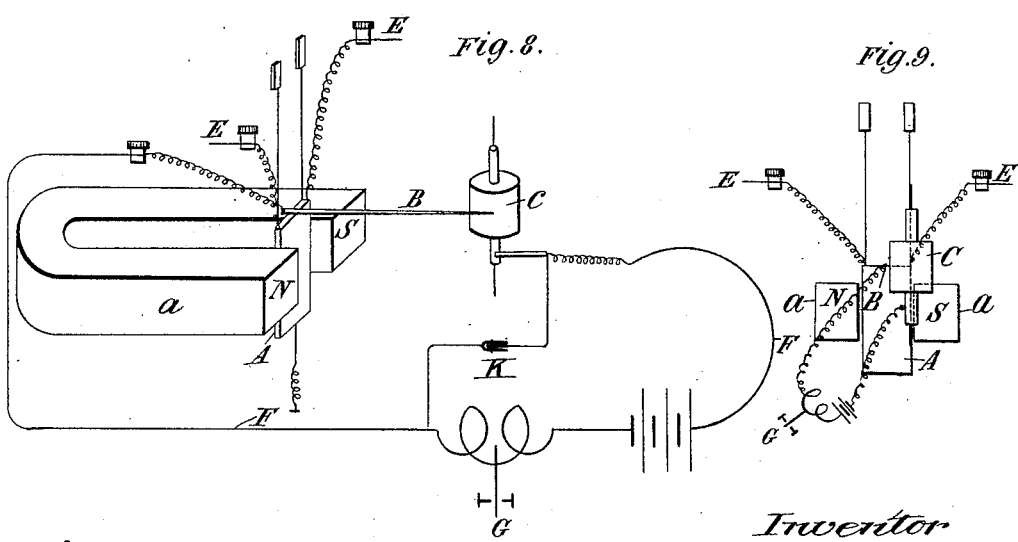

Figure 1 is an end elevation, Fig. 2 is a plan, and Fig. 3 is a side elevation with one pole of the magnet removed, of a relay apparatus made according to my invention. Fig. 4 shows a rotary drum divided into five sections insulated from one another. Fig. 4$^a$ is a diagrammatic view of the connection of the drum shown in Fig. 4. Fig. 5 is a side elevation, and Fig. 6 is a plan, of a modification of my invention in which a fixed tongue and a frictionally-controlled tongue are employed. Fig. 7 is a diagrammatic view of a modification of my invention in which the tongue is shifted on the rotary drum by means of a suspended rod and cross-piece operated by the suspended coil. Figs. 8 and 9 are diagrammatic side and end views, respectively, of a modification in which the end of the tongue is normally held out of contact with the rotary drum, contact between the said tongue and drum being made by the suspended coil when the arrival-current is received.

A is a light wire coil delicately suspended in the field of a permanent or electro magnet $a$.

B is a relay-tongue fixed to the top of the coil A.

C is a rotary drum mounted on a spindle C', supported from the frame of the instrument by suitable bearings. This drum C is made in sections separated by insulating material $c$, which may be an insulated metal ring of suitable width or may consist of the thinnest mica insulation. The free end of the tongue B bears lightly upon the rotary drum C and should be of a width not exceeding the width of the insulating-strip $c$. The main-line conductors E E are connected to the coil A by very fine wire coils. One end of the relay-circuit F is connected to the sections of the drum C by a divided battery and suitable brushes, and the other end of the said relay-circuit is connected to the tongue B.

G is a recording instrument in the relay-circuit.

$c'$ is a pulley which is mounted on the drum-spindle C' and which is connected to any suitable source of power for causing the drum C to rotate.

$b$ $b$ are adjustable screw-stops carried by the frame of the instrument for limiting the lateral movements of the tongue B.

$a'$ is a lug projecting from the bottom of the coil, and $a^2$ $a^2$ are springs having their ends at one extremity attached to said lug and their ends at the opposite extremity secured to the frame of the apparatus.

The coil A is normally suspended so that its plane is parallel to the north and south line of the magnet $a$, in which position the tongue B is in contact with the insulating-strip $c$, which is its zero position. Upon the arrival-current from the main line circulating in the coil A this coil is turned out of its plane (to an extent which depends upon the strength of the said current) and moves the tongue B laterally into contact with one of the sections of the rotary drum C, thus making contact and enabling a current to pass through the relay-circuit.

The object of rotating the drum C is to reduce the friction between it and the end of the tongue B to a minimum, so that very minute forces may be enabled to move the said tongue, as above described.

The rotary drum C may consist of any suitable number of insulated sections, such number of sections depending upon the properties it is required to give the relay. For instance, as shown in Fig. 4, when it is required to adapt the instrument for receiving over lines where the signals are likely to possess what is known as a "varying zero" the drum C may be divided into five sections $c$ $c^2$ $c^3$ $c^4$ $c^5$, insulated from one another by suitable material. $c$ is the central insulation ring or piece forming the mechanical zero of the instrument, as previously described. When the tongue B moves into contact with either of the divisions $c^2$ or $c^4$, a signal is indicated, as previously described. If the tongue B is caused by the arrival-current to move too much to one or the other side, the said tongue makes contact with one or the other of the sections $c^3$ or $c^5$, (which may be termed "correcting-sections.") These sections $c^3$ and $c^5$ are so arranged that when thus in contact with the said tongue a signal is indicated and an auxiliary relay is also worked, which auxiliary relay in turn sends a correcting-current through a few auxiliary turns of wire wound on the coil A in such a direction as when thus operated to cause the tongue B to move back toward the piece $c$ to such an extent as to make the electrical zero coincide with the mechanical zero of the instrument. Such an arrangement is shown diagrammatically in Fig. 4ª, in which A is the coil, suspended in the magnetic field, the magnet being omitted in this figure for the sake of clearness. B is the tongue fixed to the coil A. F F are the relay-circuit, one end of which is respectively connected to, by suitable brushes $f$ $f'$ $f^2$ $f^3$, the sections $c^2$ $c^3$ $c^4$ $c^5$ of the drum, and the other end of which is connected to the tongue B. F' is the relay-battery. $f^4$ $f^5$ $f^6$ $f^7$ are coils in the relay-circuit. G G' are instruments in the relay-circuit. $g$ $g'$ are the respective contact-levers of the instruments G G'. $g^2$ $g^3$ are fixed contact-points, between which the lever $g$ is adapted to oscillate. $g^4$ $g^5$ are fixed contact-points between which the lever $g'$ is adapted to ocillate. A' is the auxiliary coil, which is fixed to and insulated from the coil A and is also suspended in the magnetic field. I I are the auxiliary relay or correctional circuit, which includes the coil A', contact-levers $i$ $i'$, fixed contact-points $i^2$ $i^3$, between which the lever $i$ is adapted to oscillate, fixed contact-points $i^4$ $i^5$, between which the lever $i'$ is adapted to oscillate, a battery $i^6$, and an adjustable resistance R. The levers $i$ $i'$ are respectively under the influence of the coils $f^5$ and $f^7$. The diagram shows the apparatus at rest, the tongue B resting upon the central insulation $c$ and the relay and auxiliary relay or correctional circuits being open.

When a signaling-current of one sign passes through the coil A, the said coil moves out of its zero position, as previously described, and carries the tongue B into contact with the drum-section $c^2$. Current then passes from one terminal of the battery F', through the tongue B, section $c^2$, brush $f$, and coil $f^4$, to the other terminal of the battery F'. When the coil $f^4$ is thus excited, it causes the lever $g$ to move over to the contact $g^3$, and thereby close the circuit of the instrument G. If the tongue B is caused to move too far by the said signaling-current, the said tongue moves into contact with the drum-section $c^3$. Current then passes from one terminal of the battery F' through the tongue B, section $c^3$, brush $f'$, coils $f^5$ $f^4$, and thence to the other terminal of the battery F', the coils $f^5$ $f^4$ being thereby excited. The lever $g$ is thereby moved over to the contact $g^3$, so as to close the circuit of the instrument G, and at the same time the lever $i$ is moved over to the contact $i^3$, thereby closing the auxiliary circuit, so that a correcting-current passes from one terminal of the battery $i^6$, through the contact $i^3$, lever $i$, auxiliary coil A', resistance R, lever $i'$, and contact $i^4$, to the other terminal of the battery $i^6$, the adjustments of the apparatus being such that the said correcting-current moves back the coils A' and A, and consequently the tongue B, toward the central or zero position to such an extent as to make the electrical zero coincide with the mechanical zero of the instrument.

When signals of opposite sign are received, the tongue B coöperates either with the section $c^4$, brush $f^2$, coil $f^6$, lever $g'$, and contact $g^5$ to close the circuit of the instrument G' or the tongue B coöperates with the section $c^5$, brush $f^3$, coils $f^7$ $f^6$, levers $i'$ and $g'$, and contacts $i^5$ and $g^5$ to both close the circuit of the instrument G' and to send a correcting-current through the coil A' in the same manner as that previously described with reference to the sections $c^2$ $c^3$, brushes $f$ $f'$, coils $f^4$ $f^5$, and levers $g$ and $i$. When not thus operated by received signals, the levers $g$, $g'$, $i$, and $i'$ are adapted to fall back, respectively, against the contacts $g^2$ $g^4$ $i^2$ $i^4$, as is well understood.

If the relay-circuit is constructed for receiving cable-signals, it may, in order to facilitate the reading of the signals, especially with hand-sending, be most conveniently fitted with two contact-making tongues, one fixed to and the other frictionally controlled by the suspended coil, the motion of the fixed tongue either to right or left changing over the connections for the frictionally-controlled tongue. Such an arrangement is shown in Figs. 5 and 6, in which A is the suspended coil; B is a tongue rigidly fixed to the said coil, and B' is a tongue having a hole in it through which a rod $a^3$, fixed to the coil A, passes. The rod $a^3$ is screw-threaded and carries a screw-nut $a^4$ at its upper end. The tongue B' rests upon a boss of insulating material $a^5$ and is there retained by the spring $a^6$, one end of which bears upon the said tongue and the other end of which bears on the under side of the nut $a^4$. The tongue B' is thus frictionally attached to the coil A. The ends of the tongues B and B' at their one extremity bear upon the drum C, and their ends at the opposite extremity are connected to one end of the relay-circuit F. G G' are the recording instruments. b b are stops for limiting the lateral movements of the tongue B, and b' b' are stops for limiting the lateral movements of the tongue B'. The magnet a and remaining parts of the apparatus are omitted from these figures, but are arranged as in Figs. 1, 2, and 3.

In order to produce a signal, the tongues B B' must both be on the same side of the drum C at the same time, the current passing in a similar manner along both. Such position is shown in Fig. 6. When the arrival-current causes the coil A to turn, as previously described, both the tongues B and B' are caused to slide into contact with one side of the drum C and give a signal in the relay-circuit. After a very slight movement, however, the tongue B' is arrested by the stop b', the tongue B being able to continue its movement owing to the fact that the tongue B' is only frictionally attached to the coil A. Upon the coil A returning to its normal position the tongue B' will immediately be carried across the insulated strip c, thus breaking contact and registering the signal. If the next signal is of the same sign, the tongue B' will be again carried over to the same section of the drum, even though the amplitude of oscillation of the coil A may not have been sufficient to cause the fixed tongue B to return to zero between the signals. For an opposite signal these tongues operate in a similar manner, the tongue B being moved to the opposite side or section of the drum and the connections thus reversed. In this manner the fixed tongue B changes over the connections for the frictionally-controlled tongue B', and a very clear definition of the signals is obtained. These two tongues may be arranged on two separate instruments, the fixed tongue on one and the frictionally-constrained tongue on another, or the tongues, operated by a single coil, may make contact with two separate rotary drums.

Referring to Fig. 7, A is the coil suspended in a plane parallel to the north and south line of the magnet and adapted to receive the arrival-currents from the main line E. C is the rotary drum, the sections of which are divided by insulating material c, and connected to one end of the relay-circuit F, and G is a recording instrument, all as previously described. H is a suspended rod provided with a cross-piece h. h' h' are silk cords, or their equivalent, connecting the ends of the cross-piece h with the top of the coil A. B is the tongue which is fixed or frictionally attached to the suspended rod H and has one of its ends connected to one end of the relay-circuit and its other end bearing on the rotary drum C. When no arrival-current is received, the tongue B rests upon the insulating-strip c, and when the coil A is turned by the arrival-current from the main line, as previously described, such movement is communicated through the cords h' h', cross-piece h, and rod H to the tongue B, which latter is caused to slide into contact with one or other of the drum-sections and cause a current to pass through the relay-circuit. By placing the ends of the cords h' h' which are attached to the coil A as far apart as possible and their opposite ends, which are attached to the cross-piece h, closer together the ends of the tongue B may be caused to move through a greater angle than the coil A.

Referring to all the foregoing figures, it has been found that the resistance of contact between the end of the relay tongue or tongues and the rotary drum is not quite constant in amount, especially when the point of the tongue bears lightly on the said drum. Any variation in the strength of the current passing due to this cause may be greatly reduced by short-circuiting the rotary drum by a condenser K of suitable capacity, as shown in Figs. 1, 2, 7, and 8.

Referring to Figs. 8 and 9, the suspended coil A, connected to the main line E, the magnet a, the tongue B, connected to one end of the relay-circuit, and recording instrument G are arranged as in Fig. 1. The rotary drum C is made in a single piece, revolves in a horizontal plane, and has the other end of the relay-circuit connected to it by a suitable brush. When no arrival-current is received from the main line, the tongue B remains out of contact with the rotary drum. When the arrival-current from the main line passes through the coil A and causes it to turn, as previously described, the tongue B is moved into contact with the drum C, and thus causes a current to pass through the relay-circuit.

If the zero of the signals received from the main line is found not to be constant in position, the relay can be fitted with auxiliary coils fixed in parallel with the working coil A and receiving current from a secondary circuit, this latter current being previously sent through suitable contacts (either moving or fixed) and a circuit having resistance, induction, or capacity, or any combination of these, to reproduce the same variable effects, but in the opposite direction, in the zero, and thereby eliminate this disturbing factor from the working of the relay.

The rotary drum may be caused to spin by any convenient means, such as by fixing the armature of a small electromagnet directly on the drum-shaft. Any means (other than the coil described) which is at present known to the art may be used to impart the necessary motion to the tongue of the relay for the purpose of indicating received signals.

What I claim is—

1. In telegraphic apparatus, a tongue arranged in a relay-circuit adapted to be moved by the arrival signaling-currents, a rotary contact in the relay-circuit with which rotary contact the said tongue makes and breaks circuit, and a condenser short-circuiting the contact between the said tongue and rotary contact, substantially as described and for the purpose specified.

2. In telegraphic relay apparatus a tongue connected to one end of a relay-circuit and adapted to be moved by the arrival-current, a sectional rotary drum the sections of which are connected to the other end of the relay-circuit and with which the said tongue makes and breaks circuit, and insulating material between the sections of said drum, substantially as described for the purpose specified.

3. In telegraphic relay apparatus a magnet, a coil suspended in the field of said magnet and adapted to receive and be moved by the arrival-current, a tongue adapted to move with the said coil and connected to one end of a relay-circuit, a moving contact with which the said tongue makes and breaks circuit connected to the other end of the relay-circuit and condenser short-circuiting the contact between the said tongue and moving contact, substantially as described for the purpose specified.

4. In telegraphic relay apparatus a magnet, a coil suspended in the field of said magnet and adapted to receive and be moved by the arrival-current, a tongue adapted to move with said coil and connected to one end of a relay-circuit, a rotary drum with which the said tongue makes and breaks circuit connected to the other end of a relay-circuit and a condenser short-circuiting the contact between said tongue and rotary drum, substantially as described for the purpose specified.

5. In telegraphic relay apparatus a magnet, a coil suspended in the field of said magnet and adapted to receive and be moved by the arrival-current, a tongue connected to one end of a relay-circuit and adapted to move with said coil, a sectional rotary drum the sections of which are connected to the other end of a relay-circuit and with which the tongue makes and breaks circuit, insulating material between the sections of said drum, and stops to limit the lateral movements of said tongue, substantially as described for the purpose specified.

6. In telegraphic relay apparatus a magnet, a coil suspended in the field of said magnet and adapted to receive and be moved by the arrival-current, a tongue fixed to said coil and connected to one end of a relay-circuit, another tongue frictionally attached to said coil and connected also to the end of a relay-circuit and operated by the fixed tongue so as to change over its connections, a sectional rotary drum the sections of which are connected to the other end of a relay-circuit and with which the said tongues make and break circuit, insulating material between the sections of said drum, and stops to limit the lateral movements of the tongues, substantially as described, for the purpose specified.

7. In telegraphic relay apparatus, a magnet, a coil suspended in the field of said magnet and adapted to receive and be moved by the arrival-current, a tongue connected to one end of a relay-circuit and adapted to be moved by said coil, means for maintaining the zero position of said tongue constant, and a moving contact connected to the other end of a relay-circuit with which the said tongue makes and breaks circuit, substantially as described for the purpose specified.

8. In telegraphic relay apparatus, a magnet, a coil suspended in the field of said magnet and adapted to receive and be moved by the arrival-current, a tongue connected to one end of a relay-circuit and adapted to be moved by said coil, means for maintaining the zero position of said tongue constant, a sectional rotary drum the sections of which are connected to the other end of a relay-circuit and with which the said tongue makes and breaks circuit, insulating material between the sections of said drum, and stops to limit the lateral movements of said tongue, substantially as described for the purpose specified.

9. In telegraphic relay apparatus, a magnet, a coil suspended in the field of said magnet and adapted to receive and be moved by the arrival-current, a suspended rod, a cross-piece attached to said rod, cords attaching the cross-piece to the suspended coil, a tongue attached to said suspended rod and connected to one end of a relay-circuit, a rotary drum with which the said tongue makes and breaks circuit connected to the other end of a relay-circuit and a condenser short-circuiting the contact between the said tongue and rotary drum, substantially as described for the purpose specified.

In testimony whereof I have hereunto set my hand, in presence of two subscribing witnesses, this 17th day of May, 1899.

SIDNEY GEORGE BROWN.

Witnesses:
F. W. McLELLAN,
FRED C. HARRIS.